United States Patent [19]

Pounds et al.

[11] Patent Number: 5,688,478
[45] Date of Patent: *Nov. 18, 1997

[54] METHOD FOR SCAVENGING SULFIDES

[75] Inventors: Russell Pounds, Richmond; Doyle Cherry, Kemah, both of Tex.

[73] Assignee: Crescent Holdings Limited, Houston, Tex.

[*] Notice: The term of this patent shall not extend beyond the expiration date of Pat. No. 5,462,721.

[21] Appl. No.: 549,015

[22] Filed: Oct. 27, 1995

Related U.S. Application Data

[63] Continuation-in-part of Ser. No. 350,635, Oct. 31, 1995, Pat. No. 5,462,721, which is a continuation-in-part of Ser. No. 295,270, Aug. 24, 1994, abandoned.

[51] Int. Cl.$^6$ .............. B01D 53/48; B01D 53/52; C10G 29/20
[52] U.S. Cl. .............. 423/228; 423/229; 423/242.7
[58] Field of Search .............. 423/229, 228, 423/242.7

[56] References Cited

U.S. PATENT DOCUMENTS 5,462,721  10/1995  Pounds et al. .................. 423/229

*Primary Examiner*—Steven Bos
*Assistant Examiner*—Peter T. DiMauro
*Attorney, Agent, or Firm*—Patterson & Streets, L.L.P.

[57] ABSTRACT

A method is provides for reducing the levels of hydrogen sulfide and organic sulfides present in gaseous hydrocarbon streams by contacting the streams with a composition comprising the reaction product of an alkanolamine with a C1 to C4 dialdehyde, especially ethanedial. The method involves delivery and storage of the reactants near the gas stream to be cleaned, forming the reaction product at a rate substantially equal to the consumption of scavenger by the sulfides, delivering the scavenger to a contacting vessel, contacting the sulfides in the gas stream with the scavenger to reduce the sulfide concentration below a given level, separating the gas stream from the spent scavenger and removing the spent scavenger from the vessel.

20 Claims, 1 Drawing Sheet

METHOD FOR SCAVENGING SULFIDES

REFERENCE TO RELATED APPLICATIONS

This application is a continuation-in-part application of U.S. patent application Ser. No. 08/350,635 filed on Oct. 31, 1995, now U.S. Pat. No. 5,462,721 which is a continuation-in-part application of U.S. patent application Ser. No. 08/295,270, filed Aug. 24, 1994 now abandoned.

FIELD OF THE INVENTION

The present invention relates to methods and apparatus for sweetening hydrocarbons or aqueous systems. More particularly, the invention relates to methods and compositions for selectively reducing the levels of hydrogen sulfide and organic sulfides present in gaseous or liquid hydrocarbon streams, aqueous systems, or mixtures thereof.

BACKGROUND OF THE DISCLOSURE

Natural gas is a naturally occurring mixture of hydrocarbon and non-hydrocarbon gases found in geologic formation beneath the earth's surface, often in association with petroleum. As obtained from oil and gas wells, raw or sour natural gas contains a number of impurities which must be removed before being introduced into a pipeline. The principal impurities in natural gas are water, carbon dioxide, and hydrogen sulfide. These undesirable components are conventionally removed from raw natural gas streams in gas processing plants. The processing plants are normally located in the field and vary in size from small units to large, centrally located plants.

Hydrogen sulfide is malodorous, poisonous and, when burned, the major cause of acid rain. When gaseous or liquid fuels containing hydrogen sulfide are burned, sulfur dioxide and water are formed. Acid rain is essentially an aqueous solution containing $SO_2$, $SO_2 \cdot 6H_2O$ and sulfurous acid ($H_2SO_3$).

The composition of raw natural gas varies widely from field to field. For example, the methane content can vary between 45 percent and 96 percent by volume, while the hydrogen sulfide, $H_2S$, content may range from 0.1 parts per million (ppm) to 150,000 ppm.

Since hydrogen sulfide is corrosive in the presence of water and poisonous in very small concentrations, it must be almost completely removed from natural gas streams before use and preferably before transport or processing in oil field equipment, pipelines, and refineries. As a result, many pipeline specifications limit the amount of hydrogen sulfide to less than 0.25 grains per 100 cubic feet of gas. Accordingly, removal of $H_2S$ from hydrocarbons, e.g., natural gas, etude oil, and refined oil products is an important concern. Further, because of the large quantities of hydrocarbon material to be treated, it is important to have a means of removal that is economically efficient.

The technology known in the an for removing hydrogen sulfide from raw natural gas was developed for large processing plants to remove hydrogen sulfide in continuous processes. These large processing plants are fed by one or more natural gas wells, each of which may produce over 10 million cubic feet of natural gas per day. Many of these processes utilize commodity chemicals or proprietary materials to lower the hydrogen sulfide levels in natural gas to pipeline specifications. Also, many of these processes not only sweeten sour natural gas to pipeline specifications, but also regenerate most, if not all, of the sweetening compositions involved.

Complicating the removal problem is the fact that some treatments will have one or more good performance characteristics, but will also have some undesirable performance characteristic(s). For instance, many treatments are difficult to handle because of their viscosity, pour point, tendency to form water emulsions, or toxicity. The solubility of the treatment additive is often of paramount importance. Because of the demanding performance characteristics required of a hydrogen sulfide scavenger, the chemistry available is very limited.

U.S. Pat. No. 2,426,318 discloses a method of inhibiting the corrosive action of natural gas and oil containing soluble sulfides on metals by utilizing certain aldehydes, preferably formaldehyde. Although the aldehydes are effective in selectively reducing the sulfide levels of natural gas, they are known to form trithiane compounds upon reaction with the sulfides. The trithianes are solids which do not easily dissolve and can clog gas lines. Furthermore, aldehydes are unstable, temperature sensitive and have a tendency to polymerize. Moreover, aldehydes are known carcinogens and environmentally hazardous. For these reasons, the use of aldehydes for sweetening natural gas has come into disfavor.

U.S. Pat. No. 4,515,759 discloses a buffered aqueous solution of sodium nitrite which is injected into scrubber towers to sweeten natural gas. This system is not regenerable, limiting its use to batch processes, and produces undesirable solid elemental sulfur.

U.S. Pat. No. 4,978,512 (Dillon) discloses a method for selectively reducing the levels of hydrogen sulfide and organic sulfides from gaseous and/or liquid hydrocarbon streams, particularly natural gas streams, by contacting the streams with the reaction product of an alkanolamine with a monoaldehyde. The patent also discloses that the reaction product may be mixed with a glycol prior to contact with the gas in order to reduce the water levels in the gas.

U.S. Pat. No. 5,128,049 (Gatlin) discloses a method of using triazines as hydrogen sulfide scavengers.

U.S. Pat. No. 5,169,411 (Weers) discloses a method for preventing liberation of $H_2S$ in crude oil or petroleum residuum medium with imines.

U.S. Pat. No. 5,266,185 (Weers) discloses the suppression of hydrogen sulfides in a heavy hydrocarbon derived from heavy crude oil by contacting the petroleum with the reaction product of a heterocyclic aldehyde and an organic primary amine. The useful compound was described as an imine.

U.S. Pat. No. 5,284,576 (Weers) discloses a process for scavenging hydrogen sulfide using a scavenger prepared by reacting an alkylenepolyamine, including diethylenetriamine, and formaldehyde. In Example 1, column 4, lines 10–16, Weers taught that formaldehyde should be added to a flask of diethylenetriamine. However, this reaction results in a gel which is very difficult to handle and makes the product entirely unsuitable for use as a hydrogen sulfide scavenger.

U.S. Pat. No. 5,314,672 (Vasil) discloses a method of selectively reducing the levels of hydrogen sulfide and organic sulfides by contacting natural gas with the reaction product of ethylenediamine and 50% uninhibited aqueous formaldehyde.

Although many compositions of amine-aldehyde condensation products and methods for their use for reducing hydrogen sulfide in hydrocarbon streams have been developed, the problem has not been effectively resolved as evidenced by the number of recently issued patents which disclose alternative methods. Many of the aminealdehyde compounds which have previously been developed are unstable, or must be added in cost prohibitive amounts to effectively reduce the hydrogen sulfide levels in natural gas.

Various of the above, prior art scavengers contain excess, unreacted formaldehyde. While formaldehyde may act as a hydrogen sulfide scavenger, it forms a compound which is both crystalline and carcinogenic. Therefore, it is highly undesirable to have a scavenger system which contains any free or unreacted formaldehyde.

Despite the above efforts, there remains a need in the art for an efficient and cost effective method and scavenger for selectively reducing the levels of hydrogen sulfide and organic sulfides found in sour hydrocarbon streams and aqueous systems which has reduced toxicity, remains soluble upon reaction with hydrogen sulfide and organic sulfides, and does not form gels during the process of manufacturing the scavenger.

Although this invention concerns hydrogen sulfide "suppression", it is important to understand that no single composition can be certain to economically remove all hazardous levels of hydrogen sulfide under all circumstances. That is, hydrogen sulfide may appear in hazardous concentrations after a treatment that in similar circumstances had successfully suppressed hazardous concentrations. It is important that all potential sources of hydrogen sulfide be monitored and that any suppression means not be relied upon as infallible.

SUMMARY OF THE INVENTION

The present invention provides a method for selectively reducing the levels of hydrogen sulfide and organic sulfides present in a gas comprising the steps of providing a source of a dialdehyde having two carbonyl groups; providing a source of an alkanolamine having at least one hydrogen atom bonded directly to a nitrogen atom; reacting between about 1.5 and about 3 equivalents of hydrogen atoms bonded directly to a nitrogen atom in the alkanolamine for every equivalent of carbonyl groups in the dialdehyde to form a reaction mixture substantially free of triazines; contacting the sulfides with a scavenger consisting essentially of the reaction mixture, wherein the scavenger is produced at a rate sufficient to reduce the level of sulfides in the gas contacted below a given level, and wherein the scavenger flows directly from the reacting step to the contacting step; separating the gas from the spent composition; and discarding the spent composition.

DETAILED DESCRIPTION

Figure 1:
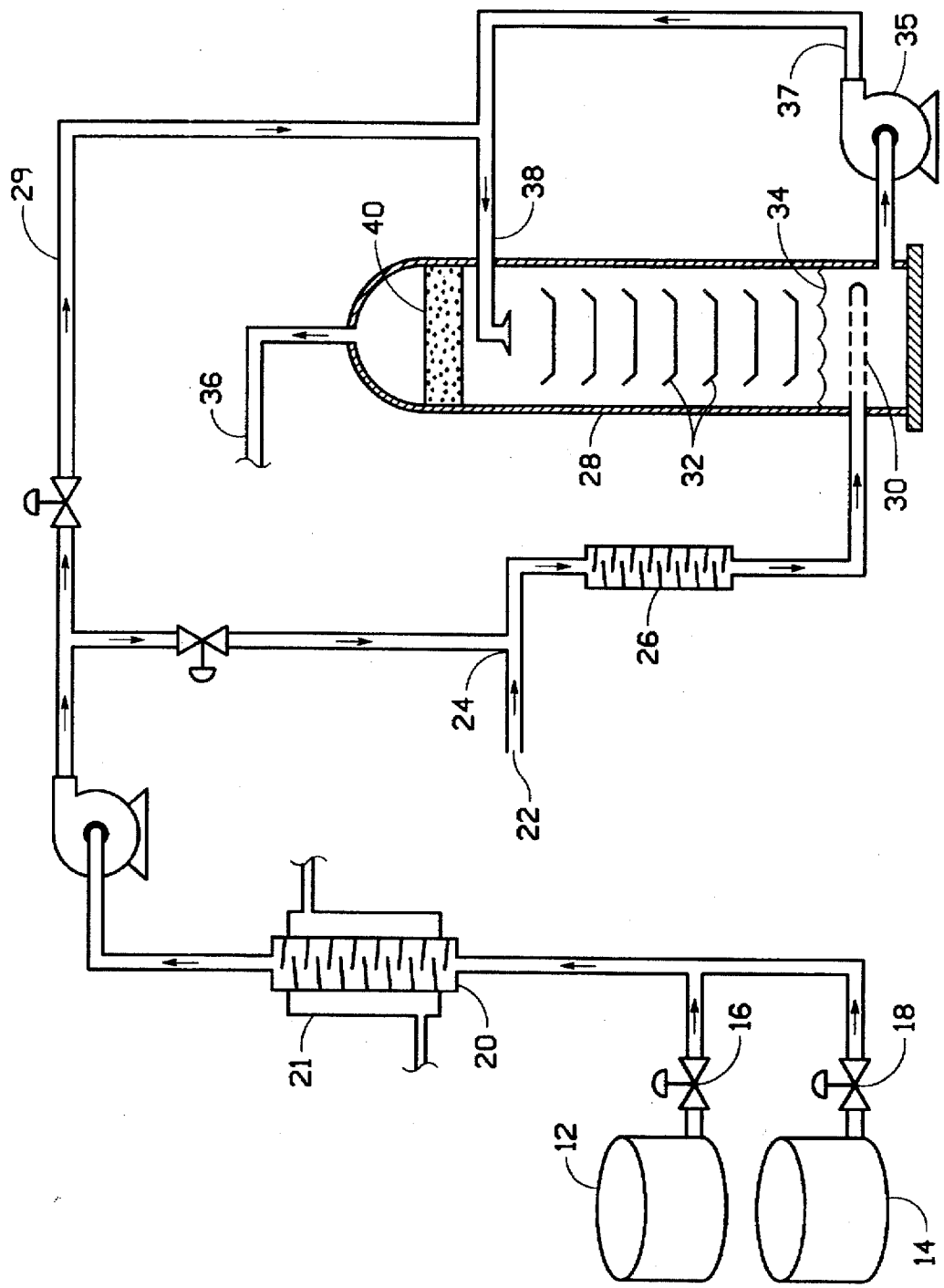

In this specification and the claims, numerical values are not critical unless otherwise stated. That is, the numerical values may be read as if they were prefaced with the word "about" or "substantially."

The present invention relates to methods and apparatus for reducing or scavenging hydrogen sulfide and/or organic sulfides in gaseous and/or liquid hydrocarbons and aqueous systems. Many industries are presently concerned with hydrogen sulfide and/or organic sulfides reduction and/or removal in their operations. It is the intention of the inventors that the methods and compositions of the invention be applied to any industry where sulfide reduction or removal is desired.

The following industries, operations and streams are some examples of where this invention is useful for removing or reducing sulfides: (1) The petroleum energy industries, including but not limited to oil field operations, gas plant operations, and refining, may use the invention to scavenge sulfides from produced gas, process gas, crude oil, residual hydrocarbons, liquefied petroleum gas, carbon dioxide gas, produced water, waterfloods, waste water disposal, drilling fluids, and vapor space in liquid hydrocarbon storage and shipping containers; (2) The manufacturing industries may use the invention in many applications, including steel plant coke oven gas; (3) Mining operations must often clean their coal seam gas or sour gas in gold, silver, helium, and all other mines where $H_2S$ is a problem or nuisance; (4) The geothermal energy industry may use the invention for water conditioning; (5) Sanitary landfills may have landfill gas that must be sweetened; (6) Municipal and industrial waste water treatment plants may require application of the invention to anaerobic digestor gas, nuisance odor control, and municipal or industrial sludge; and (7) the invention may be used to remove hydrogen sulfide and mercaptans in the pulp and paper mill industry.

The present methods and apparatus selectively reduce the levels of hydrogen sulfide, organic sulfides, and potentially other sulfides, present in gases and liquids, such as gaseous hydrocarbon streams, liquid hydrocarbon streams, aqueous systems, acid gases, or mixtures thereof. The method requires contacting the particular stream with a composition which is a reaction product of an active primary or secondary amine with an aldehyde. For purposes of this disclosure, an aldehyde includes both monoaldehydes (one carbonyl group) and dialdehydes (two carbonyl groups).

When a scavenger solution contains excess aldehyde, the aldehyde will also scavenge sulfides. However, certain monoaldehydes, such as formaldehyde, are carcinogenic. In order to avoid having free monoaldehyde in the scavenger solution, the amount of monoaldehyde and amine used to form an amine/monoaldehyde reaction product must be stoichiometrically balanced.

By contrast, dialdehydes, such as ethanedial, have a low order of toxicity and/or carcinogenicity. Therefore, it is not necessary that amine/dialdehyde reaction products be stoichiometrically balanced.

In general, the scavenging compounds of the present invention are prepared by the exothermic reaction of the amines, or blends of amines, with any C1 to C4 aldehydes. The preferred monoaldehydes include, but are not limited to, formaldehyde, acetaldehyde, propionaldehyde (propanal), and n-butyraldehyde (1-butanal). The most preferred monoaldehyde is formaldehyde. The preferred dialdehyde is ethanedial.

All of the scavengers used in the methods and apparatus of the present invention may be prepared by reacting the amine and aldehyde in an active-hydrogen:carbonyl-group ratio of between about 0.5 and about 3. However, it is preferred that the reactants be present in the ratio of two equivalents of active hydrogen in the amine for each carbonyl group equivalent in the aldehyde. An active hydrogen is a hydrogen atom bonded directly to a nitrogen atom (NH group). Thus, one mole of a primary amino group ($NH_2$, having two active hydrogens) is capable of reacting with one carbonyl group equivalent, wherein a carbonyl group equivalent may be provided either by one mole of a monoaldehyde or by one-half mole of a dialdehyde. Two moles of a secondary amino group (NH, having one active hydrogen or one NH group) are capable of reacting with one carbonyl group equivalent (CHO group). A tertiary amino group will not react with an aldehyde to form a stable compound when the manufacturing procedures of this invention are followed.

Following the ratio of one carbonyl group equivalent per two equivalents of active hydrogen, the reaction product of the present invention allows for a stoichiometrically balanced hydrogen sulfide scavenger having substantially no free aldehyde. A stoichiometrically balanced reaction is primarily important when using a carcinogenic monoaldehyde, such as formaldehyde. However, monoaldehydes, dialdehydes, or amines may be in excess for use in certain applications.

Furthermore, the aldehydes of the present invention may or may not contain water as their only solvent or may contain water with various amounts of methanol ranging from about 4% to about 15%. Typically, a 50% aqueous solution of formaldehyde does not contain methanol. Likewise, a solution of 40% ethanedial contains no methanol.

Methanol and/or water can both be utilized in the scavenger product to reduce the viscosity for use in natural gas applications. In addition, methanol, isopropanol, and ethylene glycol can be added to the solution to act as an antifreeze, which may be desirable for use in colder climates.

In accordance with the methods and apparatus disclosed herein, amine/aldehyde reaction products for scavenging hydrogen sulfide from a gas, particularly alkanolamines reacted with dialdehydes, produce hydrogen sulfide scavengers which out perform the present industry leading scavenger. These scavengers may be prepared by reacting the amine and aldehyde in any effective ratio. However, it is preferred that the scavengers be prepared by reacting the amine and aldehyde in an active-hydrogen:carbonyl-group ratio of between about 0.5 and about 6. It is most preferred that the active-hydrogen:carbonyl-group ratio be about 2 so that the reaction product is stoichiometrically balanced.

Ethanedial is the preferred dialdehyde for use in preparing the dialdehyde-based scavengers of the present invention. Ethanedial may be obtained and used in any concentration, including anhydrous solutions, but the preferred solution contains about 40% ethanedial in water.

Monoethanolamine is the preferred alkanolamine for use in preparing dialdehyde-based scavengers. Monoethanolamine may be used in any concentration, including anhydrous solutions, but the preferred solution contains about 85% monoethanolamine in water.

The most preferred reaction product is prepared by reacting a stoichiometrically balanced amount of monoethanolamine with ethanedial. This stoichiometrical balance is achieved at a ratio of 2 active hydrogens per carbonyl group. It is preferred that the temperature of this exothermic reaction be maintained below about 200° F. It is most preferred that the temperature of this exothermic reaction be maintained below about 120° F. The exact structure of this reaction product has yet to be determined. Preliminary gas chromatograph, mass spectrograph, and NMR analysis performed on the reaction product has produced no evidence that triazines or imines are present.

The color of the reaction product is effected both by the ratio of reactants and by the temperature of the reaction. At or near a stoichiometrically balanced reaction, occurring below about 120° F., the reaction product will take on a transparent redish yellow tint. When the reaction takes place at temperatures above about 120° F., the product will have a medium redish brown coloration. Within about 15–30 minutes after the product has been exposed to hydrogen sulfide, it will have a black appearance.

Additionally, regardless of the exact active hydrogen:carbonyl ratio, a monoethanolamine/ethanedial reaction product shows less tendency to form solids in a system when reacted with hydrogen sulfide and/or mercaptans than other products presently commercially available.

The following example illustrates the hydrogen sulfide scavenging performance of the monoethanolamine/ethanedial reaction product compared to an industry-leading scavenger formulation.

The following product formulations for scavenging $H_2S$ from natural gas were evaluated on Texas Gulf Coast field gas using laboratory scale testing equipment consisting of sparger-equipped clear plastic towers 1.25 inches in diameter by 16 inch in height. The volume of influent field gas was split evenly between the towers and controlled with a flow control meter at four (4) standard cubic feet per hour (scfh) for each individual tower. The $H_2S$ concentration in the influent and effluent gas was measured with a SENSIDYNE/GASTEC pump and $H_2S$ analyzer tubes. (Sensidyne and Gastec are trademarks of Sensidyne, Inc. of Clearwater, Fla.). This technique allowed the scavenging performance of the present formulations and available commercial products to be directly compared. The relative performance of the product is seen by comparing the amount of hydrogen sulfide slippage through the tower containing the liquid product.

Products 1, 3, and 4 were prepared by placing the monoethanolamine in a vessel, mixing the ethanedial and methanol together in a separate vessel, then adding the ethanedial/methanol mixture to the monoethanolamine. Product 2 was prepared by adding the monoethanolamine to the ethanedial/methanol mixture. The amounts of ethanedial and monoethanolamine are indicated below.

The field gas that was used in the evaluations had the following composition and properties:

| Methane | 92.9% |
|---|---|
| Ethane | 0.4% |
| Carbon Dioxide | 2.4% |
| Hydrogen Sulfide | 12,200 ppm |
| Gas pressure | 185 psig |
| Gas temperature | 130° F. |

Product Formulations (wt %)

| Ingredient | Prod. #1 | Prod. #2 | Prod. #3 | Prod. #4 |
|---|---|---|---|---|
| Monoethanolamine | 46.00 | 46.00 | 47.89 | 40.52 |
| Ethanedial (60% $H_2O$) | 49.86 | 49.86 | 48.55 | 55.26 |
| Methanol | 4.13 | 4.13 | 3.56 | 4.22 |

Product Test Results (ppm $H_2S$ slippage)

| Time (min) | Blank | Prod. #1 | Prod. #2 | Prod. #3 | Prod. #4 |
|---|---|---|---|---|---|
| Start | 11,500* | — | — | — | — |
| 30 | 11,000 | 395 | 360 | 420 | 2000+ |
| 60 | 9,500 | 395 | 400 | 445 | 1,600 |
| 90 | 10,100 | 400 | 390 | 410 | 600 |
| 120 | 10,200 | 400 | 400 | 410 | 600 |
| 150 | 10,100 | 400 | 400 | 400 | 670 |
| 180 | 10,100 | 650 | 650 | 550 | 820 |
| 210 | 10,100 | 1100 | 1000 | 900 | 1,020 |
| 240 | 10,500 | 1750 | 1550 | 1600 | 1,300 |
| 270 | 10,100 | 2520 | 2420 | 2350 | 2,500 |
| 300 | 10,000 | 6500 | 4500 | 4500 | 4,500 |
| 330 | 10,100 | 7300 | 8000 | 6800 | 6,200 |
| 360 | 10,000 | 8800 | 9300 | 8500 | 8,200 |
| 390 | 10,500 | 9800 | 9000 | 8500 | 8,500 |

*This blank was drawn from the wellhead rather than the tower.

EXAMPLE 2

A formulation of the present invention, labeled Product #5, was tested according to procedures of Example 1, above, along with the industry standard hydrogen sulfide scavenger, SULFASCRUB HSW 0700F. The HSW 0700F product of the SULFASCRUB (a trademark of the Petrolite Corporation, St Louis, Mo.) product line is available from the Petrolite Corporation of St. Louis, Mo.

Product #5 is similar to Product #1 of Example 1. Product #5 was prepared by placing 46.00 wt % of a 85% monoethanolamine solution in a vessel, mixing 50 wt % of a 40% ethanedial solution and 4 wt % of methanol together in a separate vessel, then adding the ethanedial/methanol mixture to the monoethanolamine.

Product Comparison Results (ppm H₂S slippage)

| Time Elapsed (minutes) | Blank | HSW 0700F (ppm H₂S Slippage) | HSW 0700F (% H₂S removal) | Prod. #5 (ppm H₂S Slip) | Prod. #5 (% H₂S removal) |
| --- | --- | --- | --- | --- | --- |
| Start | 11,000 | — | | — | |
| 15 | 10,800 | 225 | 97.9 | 250 | 97.7 |
| 45 | 10,200 | 270 | 97.4 | 330 | 96.8 |
| 60 | 10,200 | 245 | 97.6 | 250 | 97.5 |
| 90 | 10,100 | 340 | 96.6 | 250 | 97.5 |
| 105 | 10,100 | 390 | 96.1 | 310 | 96.9 |
| 120 | 10,000 | 420 | 95.8 | 340 | 96.6 |
| 135 | 10,200 | 490 | 95.2 | 410 | 96.0 |
| 150 | 9,900 | 550 | 94.4 | 470 | 95.3 |
| 165 | 9,900 | 650 | 93.4 | 530 | 94.6 |
| 180 | 10,000 | 790 | 92.1 | 710 | 92.9 |
| 195 | 10,000 | 1025 | 89.8 | 980 | 90.2 |
| 210 | 10,000 | 1300 | 87.0 | 1250 | 87.5 |
| 225 | 10,000 | 2150 | 78.5 | 1600 | 84.0 |
| 240 | 10,000 | 3200 | 68.0 | 2200 | 78.0 |
| 255 | 10,000 | 6000 | 40.0 | 3100 | 69.0 |
| 270 | 10,000 | 7000 | 30.0 | 4250 | 57.5 |
| 285 | 10,000 | 7900 | 21.0 | 5800 | 42.0 |
| 300 | 10,000 | 8200 | 18.0 | 7500 | 25.0 |

In the above example, which was carried out at four (4) standard cubic feet of gas per hour for a period of 300 minutes, the overall absorption efficiency of Product #5 is about 83.2% and the overall absorption efficiency of HSW 0700F is about 77.3%. Based upon the relative hydrogen sulfide slippage given in the table above, the monoethanolamine/ethanedial reaction Product #5 yields an overall absorption efficiency that is significantly more than 6 percent greater that the HSW 0700F. Based upon the continuing absorption capacity of Products #1-4 between 300 and 390 minutes in Example 1, it is believed that the overall absorption capacity of the monoethanolamine/ethanedial reaction product may be as much as 10 percent greater than that of HSW 0700F.

Prior to the test, Product #5 was observed to have a medium brown tint, primarily due to the approximately 145° F. reaction temperature, and a viscosity just slightly greater than water. Immediately upon intitiation of the test, exposing Product #5 to hydrogen sulfide, the color began turning a darker brown until reaching a dark black color within about 30 minutes. Once depleted, the spent Product #5 had a viscosity similar to used automotive oil.

EXAMPLE 3

3. Two tests were performed to compare the hydrogen sulfide scavenging capacity of six reaction mixtures prepared with different molar ratios of monoethanolamine and glyoxal ranging from 1:1 up to 3:1. An aliquot of 30 ml of each reaction mixture, without dilution, was placed into a glass tower. One standard cubic foot per hour (SCFH) of a gas containing about 1% hydrogen sulfide, about 5% carbon dioxide and about 94% methane was bubbled into the bottom of the tower. In each test, a sample of the gas into the towers was measured to provide a control or blank. The tests were carried out over a period of three hours and fifteen minutes, taking measurements of the parts per million of hydrogen sulfide in the gas out the top of each tower every fifteen minutes. The results of these tests are contained in the table below.

| Time Elapsed | Test #1 Hydrogen Sulfide in Exit Gas (PPM) | | | | Test #2 Hydrogen Sulfide in Exit Gas (PPM) | | | |
| --- | --- | --- | --- | --- | --- | --- | --- | --- |
| | Blank | 1.5:1 | 2:1 | 2.5:1 | Blank | 1:1 | 2:1 | 3:1 |
| 0 | 12,900 | — | — | — | 13,500 | — | — | — |
| 15 | — | 420 | 12 | 7 | — | 9,000 | 20 | 5 |
| 45 | — | 1,000 | 46 | 22 | — | 7,800 | 84 | 19 |
| 75 | — | 1,300 | 150 | 46 | — | 8,500 | 210 | 62 |
| 105 | — | 1,450 | 375 | 117 | — | 10,600 | 430 | 108 |
| 135 | — | 1,400 | 475 | 210 | — | 8,600 | 940 | 235 |
| 165 | — | 1,100 | 725 | 425 | — | 10,200 | 1,100 | 550 |
| 195 | — | 1,700 | 1,000 | 800 | — | 10,400 | 1,700 | 1,100 |

The tests show that reaction mixtures having a monoethanolamine:glyoxal ratio of between about 2:1 and about 3:1 remove significantly more hydrogen sulfide from the gas than do reaction mixtures with ratios of 1.5:1 and below. As the data supports, compositions prepared at ratios at 1.5:1 and below react with hydrogen sulfide much slower than those with ratios above 1.5:1 and, therefore, would require unacceptably large scrubber towers in order to provide sufficient contact time to reduce the hydrogen sulfide concentration in many sources of natural gas down to pipeline specifications. A reaction rate that is sufficiently fast to minimize the size and cost of physical equipment, such as scrubber towers, is an important commercial consideration in choosing a sulfide scavenger. The performance shown in the table for compositions prepared at ratios of 1.5:1 and below would not be sufficient to meet these commercial standards. By contrast, the performance of compositions prepared at ratios above 1.5:1 is dramatically improved. In certain circumstances, the compositions prepared at ratios between about 2:1 and about 3:1 have been found to out perform the top sulfide scavenger in the industry.

When sweetening gas, the addition of selected surfactants to a hydrogen sulfide scavenger will typically enhance the performance of the scavenger by promoting intimate contact between the scavenger and the hydrogen sulfide in the gas. Surfactants are especially useful in systems where aqueous and/or hydrocarbon fluids are present and tend to interfere with contact. Applications where gas is sweetened through use of in-line injection, scrubbing towers, or a combination of the two benefit the most from surfactants. When surfactant-containing scavengers are used in contact towers (scrubbers), the foam height within the tower may be controlled by type and amount of surfactant employed as well as the adjustment of the fluid level within the tower. In this way, carryover problems may be avoided.

All surfactants may be used in selected hydrogen scavenger applications. The surfactants may be nonionic, anionic, cationic, amphoteric, or combinations thereof. An example of a nonionic surfactant useful in combination with the alkanolamine:ethanedial scavenger is the reaction product of nonylphenol and about 10 to about 12 moles of ethylene oxide.

Surfactants can be used to fine tune a formulation for application in specific circumstances, such as tower height, in-line injection, hydrogen sulfide concentration, and the like. The amount of surfactant that is added to the scavenger of the present invention may be any amount, but will typically vary from about 0.05% to about 5% by volume of the total scavenger solution depending on the particular application. The preferred surfactant concentrations are less than one percent (1.0%).

The hydrogen sulfide scavengers described can be applied in various ways. When sweetening natural gas, the scavenger can be placed into a contact (scrubber) tower, sprayed into a packed tower, injected into the well at the well-head, injected in-line before and/or after the gas/liquid separators, and/or injected upstream of in-line static mixers (with or without atomization). Multiple injection points or contacting towers may be utilized as necessary to accommodate the volume of gas and/or the hydrogen sulfide levels specified. It is also possible to use a combination of the above application techniques.

The rapid reaction that occurs between alkanolamines and ethanedial as well as the lower toxicity of ethanedial, as compared to formaldehyde, are important characteristics for on-site and on-demand manufacturing of a organic sulfide scavenger formed by the reaction between an alkanolamine and ethanedial.

FIG. 1 shows a typical apparatus 10 for carrying out the methods described herein. An alkanolamine storage vessel 12 and a dialdehyde storage vessel 14 are located near the site at which a gas containing sulfides is to be sweetened. While this is typically near the well-site, gas may be sweetened at any point according to the present methods. Control valves 16 and 18 are used to measure the flow of fluid from the alkanolamine and dialdehyde storage vessels, respectively. The ratio of flow through the valves 16 and 18 is determined by the particular reaction ratio desired, typically between about 2 and about 6 equivalents of hydrogen atoms bonded directly to a nitrogen atom in the alkanolamine for every equivalent of carbonyl groups in the dialdehyde, and the degree of dilution of the reactants. The overall flow rates are determined by the gas stream flow rate, the sulfide concentration within the gas, and the acceptable level of sulfide within the sweetened gas.

The reactants flow together and enter a static mixer 20 with sufficient residence time to allow a complete reaction. Since the glyoxal/alkanolamine reaction is exothermic, cooling may be required at times to keep the temperature in the desirable ranges. Cooling may be achieved, for example, by the use of a cooling device 21, such as a fin fan, refrigeration system or a water jacket arrangement, around or near the reaction zone.

The reaction mixture may then be directly contacted with a sour gas stream 22. According to FIG. 1, this contact may involve in-line injection of the reaction mixture (at point 24) prior to an in-line static mixer 26 for promoting contact of the fresh reaction mixture with the sulfides in the gas stream 22. The gas and reaction mixture then enter a contacting tower 28 through a sparger 30 at the bottom of the tower 28. Alternatively or in combination, the reaction mixture may be placed directly into the tower 28 through a line 29. While the tower is shown having a number of trays 32, the tower 28 may be an open spray tower or contain packing or trays.

The gas rises through a liquid level 34 at the bottom of the tower 28, contacts the reaction mixture throughout the tower, and exits the tower at the top 36. The partially spent reaction mixture forming the liquid level 34 may be recirculated through a pump 35 to near the top of the tower 28 at point 38 and sprayed downward over the trays.

Additionally, fresh reaction mixture may be injected into the recirculation line at point 37 and/or the top of the tower 28 at point 40.

While the embodiment of FIG. 1 is a preferred mode of practicing the methods described herein, it should be recognized that other specific apparatus or configurations of contacting equipment are within the scope of the invention.

What is claimed is:

1. A method for reducing the level of hydrogen sulfide or organic sulfides present in a gas comprising the steps of:
   (a) providing a source of a dialdehyde having two carbonyl groups;
   (b) providing a source of an alkanolamine having at least one hydrogen atom bonded directly to a nitrogen atom;
   (c) reacting between about 1.5 and about 6 equivalents of hydrogen atoms bonded directly to a nitrogen atom in the alkanolamine for every equivalent of carbonyl groups in the dialdehyde to form a reaction mixture substantially free of triazines;
   (d) contacting the sulfides in the gas with a scavenger consisting essentially of the reaction mixture, and
   (e) separating the gas from the spent composition.

2. The method of claim 1 wherein the dialdehyde is ethanedial.

3. The method of claim 1 wherein the scavenger further comprises a surfactant.

4. The method of claim 1 wherein the alkanolamine is selected from the group consisting of aminoethylethanolamine, monoethanolamine, isopropanolamine, 2-amino-1-butanol, 2-amino-2-methyl-1-propanol, 2-amino-2-methyl-1,3-propanediol, 2-amino-2-ethyl-1,3-propanediol, tris(hydroxymethyl)aminomethane, and mixtures thereof.

5. The method of claim 1 wherein the alkanolamine is monoethanolamine.

6. The method of claim 1 wherein the amounts of dialdehyde and alkanolamine provide about 2 equivalents of hydrogen atoms bonded directly to a nitrogen atom in the alkanolamine for every equivalent of carbonyl groups in the dialdehyde.

7. The method of claim 1 wherein the alkanolamine is monoethanolamine and the dialdehyde is ethanedial, wherein the scavenger reacts with the sulfide to form a waste product characterized in that substantially no solids are present.

8. The method of claim 1 wherein the reaction between the dialdehyde and the alkanolamine takes place at a temperature less than about 200° F.

9. The method of claim 1 wherein the dialdehyde is an aqueous solution comprising about 40 percent ethanedial in water.

10. The method of claim 1 wherein the reaction between the dialdehyde and the alkanolamine takes place at a temperature less than about 150° F.

11. The method of claim 1 wherein the reaction between dialdehyde and alkanolamine occurs substantially within a static mixer.

12. The method of claim 1 wherein the source of dialdehyde comprises about 32 weight percent ethanedial and a diluent selected from the group consisting of ethylene glycol, methanol, and mixtures thereof.

13. The method of claim 12 wherein the source of alkanolamine comprises about 85 weight percent monoethanolamine in water.

14. The method of claim 13 wherein the source of alkanolamine is reacted with a substantially equal volume of the source of ethanedial.

15. A method of reducing the level of hydrogen sulfide or organic sulfides present in a gas, a liquid, or a mixture thereof, comprising the step of contacting the sulfides with a composition consisting essentially of the reaction mixture formed from the reaction between:

(a) a dialdehyde having two carbonyl groups; and (b) an alkanolamine having at least one hydrogen atom bonded directly to a nitrogen atom, wherein the mounts of dialdehyde and alkanolamine provide between about 1.5 and about 6 equivalents of hydrogen atoms bonded directly to a nitrogen atom in the alkanolamine for every equivalent of carbonyl groups in the dialdehyde, and wherein the reaction mixture is substantially free of triazines.

16. The method of claim 15 wherein the dialdehyde is ethanedial.

17. The method of claim 15 wherein the alkanolamine is selected from the group consisting of aminoethylethanolamine, monoethanolamine, isopropanolamine, 2-amino-1-butanol, 2-amino-2-methyl-1-propanol, 2-amino-2-methyl-1,3-propanediol, 2-amino-2-ethyl-1,3-propanediol, tris(hydroxymethyl)aminomethane, and mixtures thereof.

18. The method of claim 15 wherein the alkanolamine is monoethanolamine.

19. The method of claim 15 wherein the alkanolamine is monoethanolamine and the dialdehyde is ethanedial, wherein the composition reacts with the sulfide to form a waste product characterized in that substantially no solids are present.

20. The method of claim 15 wherein the reaction between the dialdehyde and the alkanolamine takes place at a temperature less than about 200° F.

* * * * *